US012788140B2

(12) United States Patent
Arnot

(10) Patent No.: US 12,788,140 B2
(45) Date of Patent: Nov. 10, 2026

(54) LIGHTWEIGHT EASY TO ASSEMBLE SHELVING UNIT

(71) Applicant: STERLING FLEET OUTFITTERS, INC., Surrey (CA)

(72) Inventor: Wesley Arnot, Langley (CA)

(73) Assignee: Packd Upfit Equipment Inc., Surrey (CA)

( * ) Notice: Subject to any disclaimer, the term of this patent is extended or adjusted under 35 U.S.C. 154(b) by 301 days.

(21) Appl. No.: 18/403,237

(22) Filed: Jan. 3, 2024

(65) Prior Publication Data

US 2024/0215716 A1 Jul. 4, 2024

Related U.S. Application Data

(60) Provisional application No. 63/436,885, filed on Jan. 4, 2023.

(51) Int. Cl.
*A47B 47/00* (2006.01)
*F16B 5/06* (2006.01)

(52) U.S. Cl.
CPC ............ *A47B 47/00* (2013.01); *F16B 5/0614* (2013.01)

(58) Field of Classification Search
CPC ..... A47B 7/00; A47B 47/0041; A47B 47/028; A47B 96/1441; A47B 96/14; F16B 5/0614
USPC ........................................................ 312/265.5
See application file for complete search history.

(56) References Cited

U.S. PATENT DOCUMENTS

| | | | | | |
|---|---|---|---|---|---|
| 3,339,749 | A * | 9/1967 | Odegaard | A47G 25/0692 | 16/93 D |
| 3,868,021 | A * | 2/1975 | Heinrich | E05D 15/0682 | 211/184 |
| 4,148,535 | A * | 4/1979 | Fenwick | A47B 47/04 | 312/265.5 |
| 4,373,448 | A * | 2/1983 | Pallotta | A47B 96/021 | 108/29 |
| 4,378,137 | A * | 3/1983 | Gibson | A47B 47/03 | 312/265.3 |
| 4,407,476 | A * | 10/1983 | Bohannan | A47B 96/021 | 211/90.01 |
| 4,665,838 | A * | 5/1987 | Minshall | A47B 47/021 | 211/186 |
| 4,917,528 | A * | 4/1990 | Shewchuk | F16B 2/065 | 403/231 |
| 5,211,292 | A * | 5/1993 | Paolucci | A47B 87/0269 | 211/41.12 |
| 5,221,131 | A * | 6/1993 | Lesperance | A47B 47/025 | 312/265.3 |
| 5,349,909 | A * | 9/1994 | Smit | F16B 12/14 | 108/193 |

(Continued)

*Primary Examiner* — Daniel J Troy
*Assistant Examiner* — Timothy M Ayres
(74) *Attorney, Agent, or Firm* — Dickinson Wright PLLC

(57) ABSTRACT

A shelving unit having first and second end panels supporting shelve. First and second shelf mounts are attached to the end panels for supporting a shelf bottom. The shelf mounts are mounted parallel to and spaced apart from one another to create a front and a back of the shelf. Each shelf mount has a first receiver adjacent the top of the shelf mount and a second receiver adjacent the bottom. Jaws extend from the shelf mount to receive the shelf bottom. A divider can be installed to section the shelves. Hooks protrude from the shelf mount for snapping in the dividers. Doors can also be installed in the shelving unit.

21 Claims, 7 Drawing Sheets

(56) References Cited

U.S. PATENT DOCUMENTS

| | | | | | |
|---|---|---|---|---|---|
| 6,027,192 | A * | 2/2000 | Irace | A47B 96/021 | 312/263 |
| 6,412,739 | B1 * | 7/2002 | Smith | A47B 96/02 | 248/248 |
| D525,934 | S * | 8/2006 | Panasewicz | D6/662 | |
| 7,600,887 | B2 * | 10/2009 | Sherman | A47B 97/00 | 362/217.1 |
| 7,641,253 | B2 * | 1/2010 | Steiger | B60P 3/14 | 296/24.4 |
| 7,784,885 | B2 * | 8/2010 | Steiger | B60R 11/00 | 108/106 |
| 7,824,055 | B2 * | 11/2010 | Sherman | A47F 11/10 | 362/127 |
| 8,117,972 | B2 * | 2/2012 | Winget | A47B 96/02 | 108/108 |
| 8,157,312 | B2 * | 4/2012 | Bliss, Jr. | B60P 3/14 | 224/403 |
| 8,408,638 | B2 * | 4/2013 | Pencak | B62D 33/04 | 296/37.6 |
| 8,414,046 | B2 * | 4/2013 | Pencak | B60R 5/04 | 296/24.44 |
| 8,813,980 | B1 * | 8/2014 | Billman | A47B 96/021 | 211/187 |
| 8,944,483 | B2 * | 2/2015 | Richter | A47B 96/02 | 296/24.44 |
| D1,080,277 | S * | 6/2025 | Xinidakis | D6/705.7 | |
| 2005/0225108 | A1 * | 10/2005 | Panasewicz | B60R 11/00 | 296/24.44 |
| 2016/0051044 | A1 * | 2/2016 | Sabounjian | A47B 47/021 | 211/186 |
| 2023/0099221 | A1 * | 3/2023 | Sellars | A47B 51/00 | 414/800 |

* cited by examiner

LIGHTWEIGHT EASY TO ASSEMBLE SHELVING UNIT

CROSS-REFERENCE TO RELATED APPLICATIONS

This application claims the benefit of U.S. Provisional Application Ser. No. 63/436,885 filed Jan. 4, 2023, which is incorporated herein by reference in its entirety

TECHNICAL FIELD

This invention relates generally to shelving units and more particularly to lightweight, easy to assemble shelving units, particularly useful for mounting within vehicles.

BACKGROUND OF THE INVENTION

Shelving units are commonly installed within vehicles, particularly working vans and trucks. There are numerous problems with known shelving units. One of the biggest problems is the weight of the shelving units. The main weight component is the shelves themselves which are normally made of plywood or steel. The plywood is heavy and with numerous shelves the weight is increased dramatically. The added weight results in more power needed to operate the vehicle and is particularly an issue with electric vehicles.

Another problem with the shelves is that they typically must be assembled using a hydraulic clamping press to press the heavy plywood shelves into position. This requires the shelving units to be pre-assembled resulting in increased shipping costs or the need to install the shelving units at the shelving factory.

What is needed is a lightweight shelving unit. Additionally, if desired a shelving unit that can be shipped unassembled for assembly with simple hand tools at the destination.

SUMMARY OF THE INVENTION

A shelving unit having first and second end panel and at least one shelf adapted to extend between said first and second end panels.

First and second shelf mounts support the shelf. Each shelf mount has an elongated body defined by an interior side, exterior side, top, bottom, mid-section and opposed ends. The first and second shelf mounts are adapted to be mounted at their opposed ends between the first and second end panels parallel to and spaced apart from one another to create a front and a back of said at least one shelf.

Each shelf mount has a first receiver adjacent the top and a second receiver adjacent the bottom. Each receiver can receive a fastener to mount the first and second shelf mounts to the first and second end panels.

A first jaw and second jaw extend outwardly from the mid-section of the interior side of the shelf mounts. The first and second jaws facing one another and are adapted to receive a shelf. The jaws have opposed fingers that are adapted to flex for frictional receipt of the shelf. A divider mounting hook protrudes from the mid-section of the shelf mounts for receipt of a divider clip.

Dividers can be mounted to the shelves to section the shelves. Divider clips retain the dividers. The divider clips are connected to the interior side of the shelf mounts. Each of the divider clips has a base and a mounting slot with mounting slot defined by opposed walls adapted to receive the divider. The divider clips are clipped to the shelf mounts and snap on the hooks. Doors can also be installed to the shelving unit. The doors are mounted between two vertically spaced shelf mounts.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
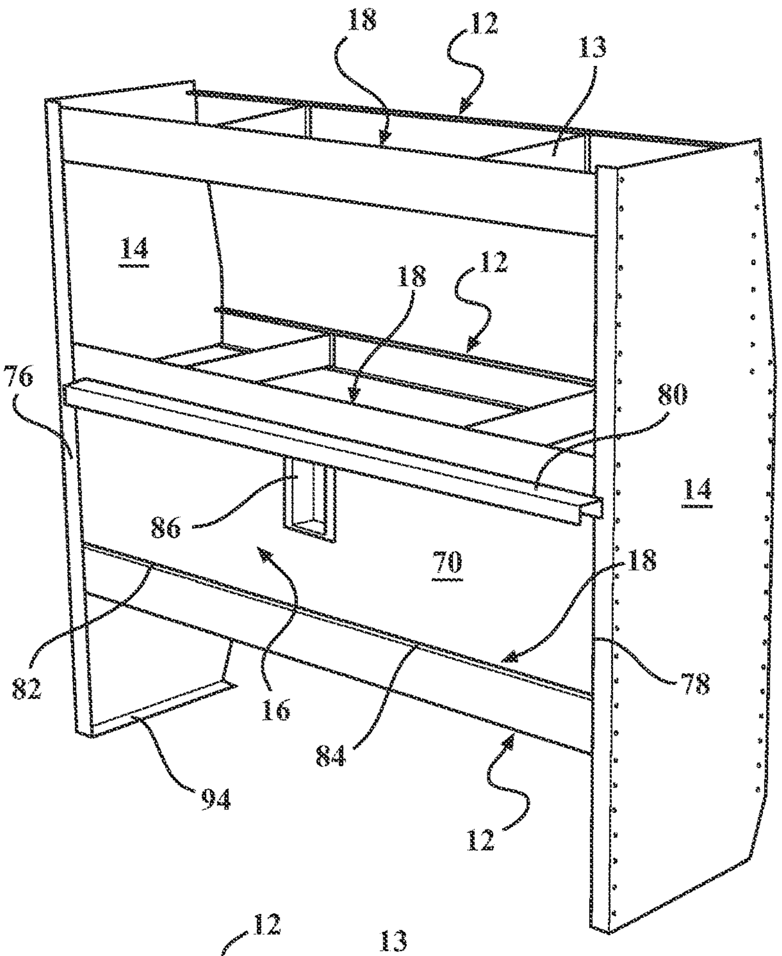
FIG. 1 is a perspective view of the shelving unit of the present invention with an optional door assembly.
Figure 2:
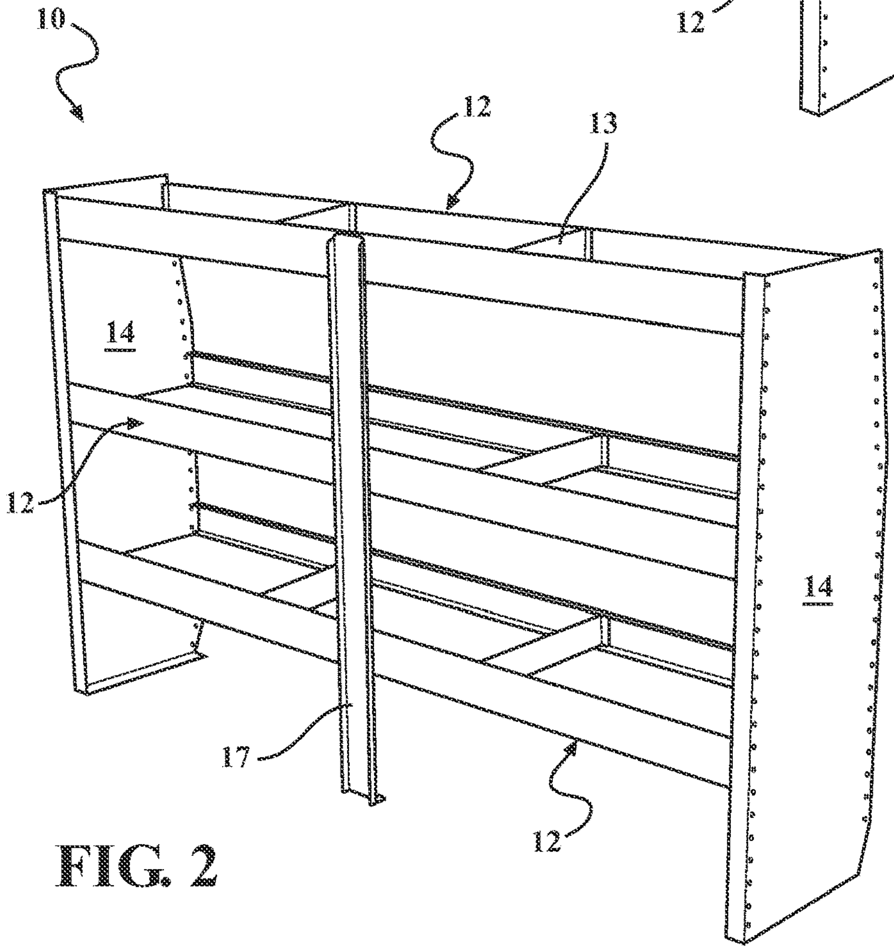
FIG. 2 is a perspective view of the shelving unit.

The shelving unit of the present invention is shown generally at 10 in FIGS. 1 and 2. The shelving unit 10 has shelves 12, dividers 13 end panels 14 a center support 17 and optional locking door assemblies 16. As will be appreciated by those of ordinary skill in the art, the shelving unit 10 can be mounted within a vehicle. Additionally, the center support 17 is optional, for example as shown, the center support 17 is used with a longer shelf unit as seen in FIG. 2, as opposed to a shorter shelf unit as shown in FIG. 1.

Figure 5:
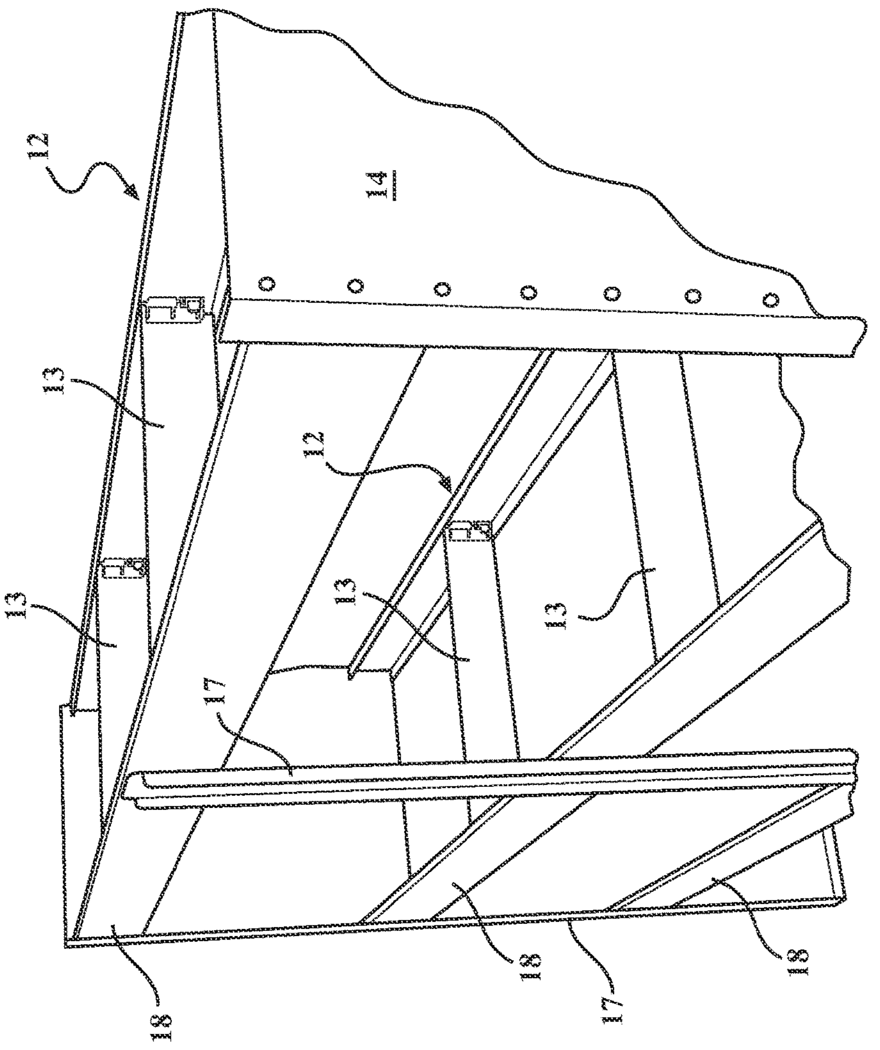
FIG. 5 is a perspective view of the shelving unit and the shelf mount.
Figure 3:
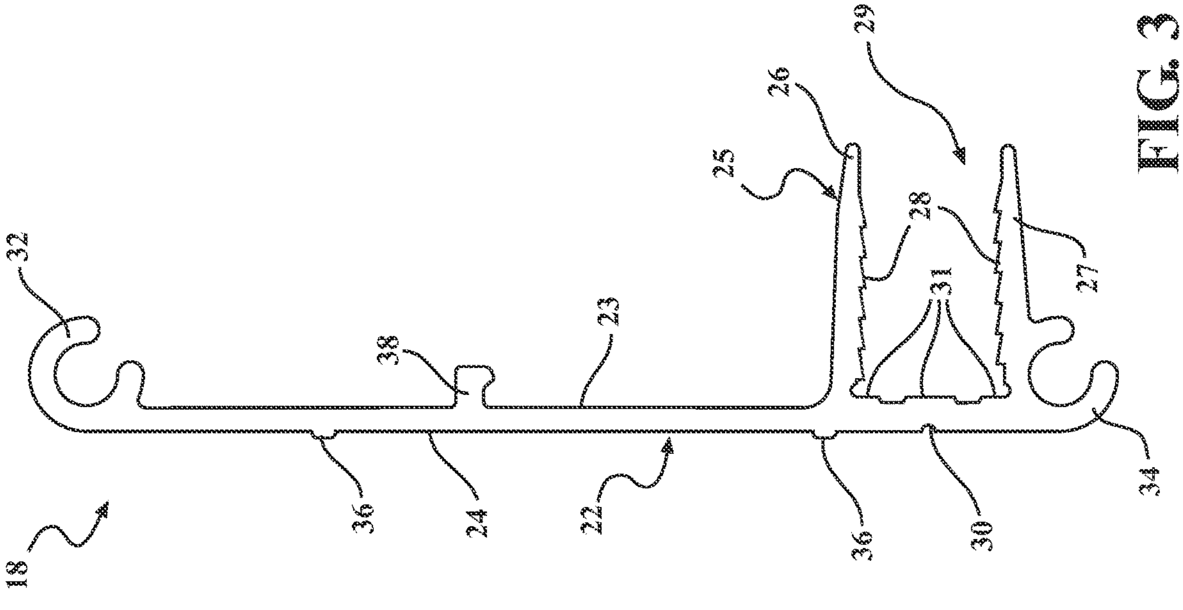
FIG. 3 is a side view of the shelf mount extrusion showing the divider clip retainer tab/hook and the shelf retainer jaws.
Figure 4:
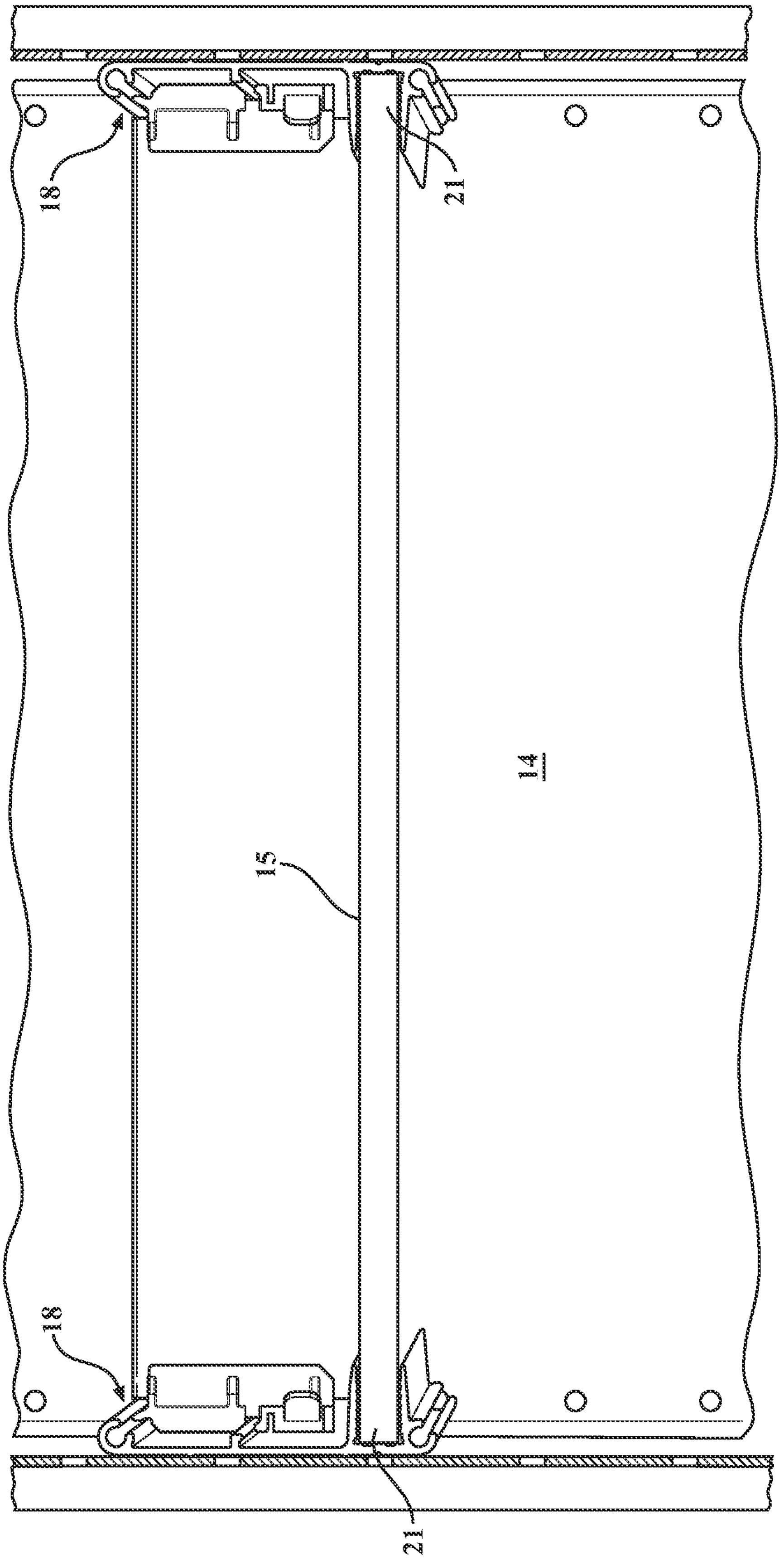
FIG. 4 is a cross section of the shelf with divider clips and divider in place.

With reference to FIGS. 3 through 5, the extruded shelf mounts 18 will be described. In the disclosed embodiment, the shelf mount extrusions 18 extend between the end panels 14 and are attached to the end panels 14. In the disclosed embodiment, screws are used to attach the shelf mounts 18 to the end panels 14. Further, in the disclosed embodiments, there is a shelf mount 18 defining the front and back of each shelf 12. The extrusions 18 in the disclosed embodiment are made of aluminum but could be made of other materials such as reinforced plastic. As shown in FIG. 4, a shelf bottom 15 is mounted between the shelf mounts 18. The shelf bottom has opposite edges 21 that are connected to and supported by the shelf mounts 18.

In the disclosed embodiment, the shelf bottom 15 is made from a lightweight corrugated composite plastic material. An example of a material that can be used is sold by Pro Design Group under the product name Corerigid™. The use of lightweight corrugated plastic material provides a strong bottom 15 while at the same time greatly reducing the weight of the shelf unit. In addition, the lightweight corrugated composite plastic material allows for easy assembly of the shelf bottom 15 to the shelf mounts 18.

The shelf mount 18 has a body 22 which has an inner surface 23 and an outer surface 24. A jaw 25 is formed at the bottom of the shelf mount body 22. The jaw 25 has opposed fingers 26 and 27. Teeth 28 are formed on the inner surface of each finger 26 and 27. The teeth 28 engage with the opposite edges 21 of the shelf bottom 15. By using opposed fingers 26 and 27, the shelf bottom can be manually inserted between these opposed fingers 26 and 27 without the need for a hydraulic clamping system to force the shelving units into place as is traditionally used with shelving units of this type. The fingers 26 and 27 can flex for receipt of the bottom 15 and tightly grip the bottom 15. The use of fingers 26 and 27, the teeth 28 and the corrugated bottom 15 allow for easier manual assembly of the shelf unit.

The throat or base 29 of jaws 25 have ridges 31 to reduce weight and to receive adhesive for securing the shelf bottom 15 to the shelf mount 18. Grooves 30 are formed on the outer surface 24 of the shelf mount body 22 for the receipt of fasteners to attach the body 22 to the center support 17.

Receivers or extrusion screw bosses 32 and 34 are formed on opposed ends of the shelf mount body 22 to receive fasteners to attach the shelf mount 20 to the end panels 14. The receivers 32 and 34 are shown having a circular profile but could have different shapes, such as oblong, square, triangular etc. The receivers 32 and 34 are also shown with an elongated slot 35.

The receivers 32 and 34 are adapted to receive fasteners, such as screws which are inserted through the end panels 14 into the receivers 32 and 34 to connect the shelf mount 18 to the end panels 14. End panels 14 can have locator openings as illustrated in the various figures for receipt of the screws to make assembly easier.

Spacers 36 protrude from the outer or exterior surface 24 of the shelf mount 18. Spacers 36 allow space to locate door hinges, L series tracking, and to provide room for the door assembly 16 to shut against the surface 24. These will be discussed in greater detail below.

A hook 38 protrudes from the interior or inner surface 23 of the shelf mount 22. The hook is adapted to receive the divider clips 40.

Figure 6B:
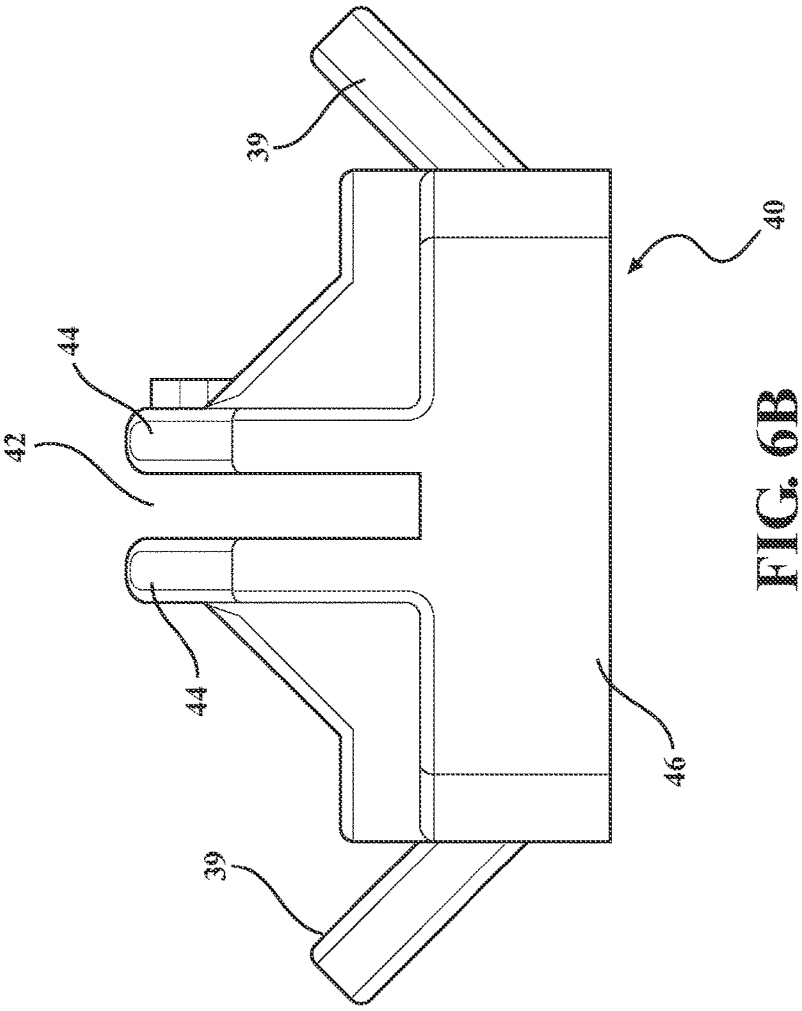
FIGS. 6A and 6B illustrate the divider retainer clip.
Figure 6A:
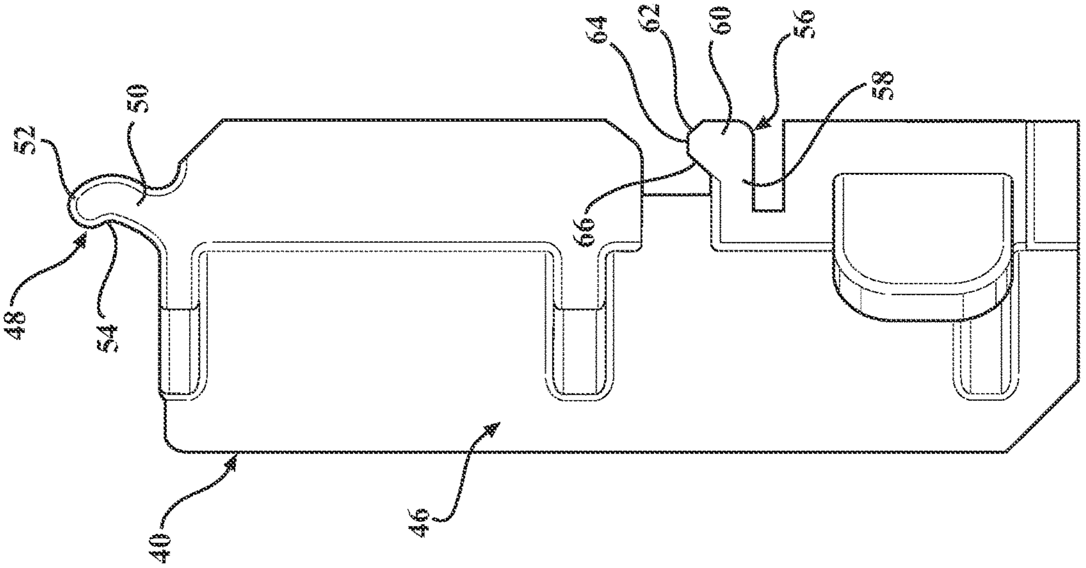
Figure 8:
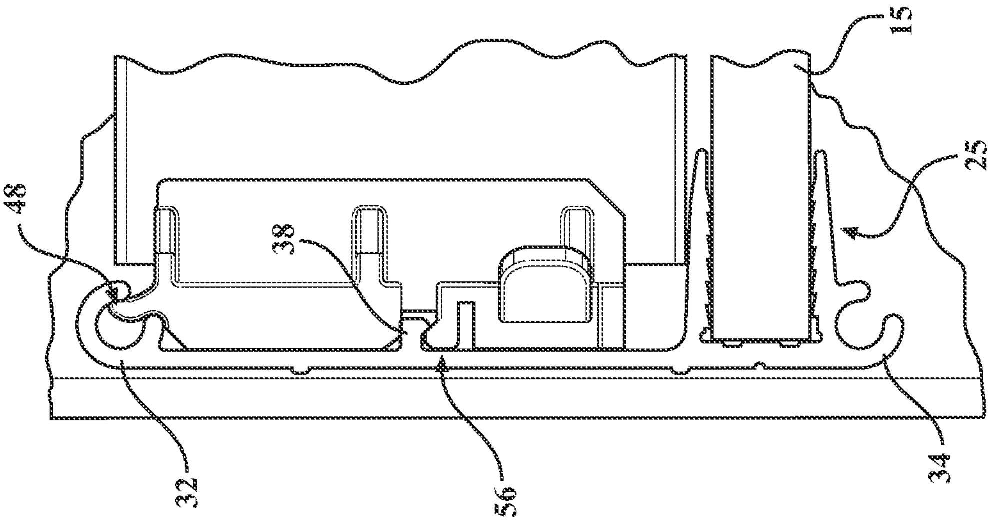
FIG. 8 is a partial cutaway view all of the divider clip, divider, shelf mount, and bottom shelf.
Figure 7:
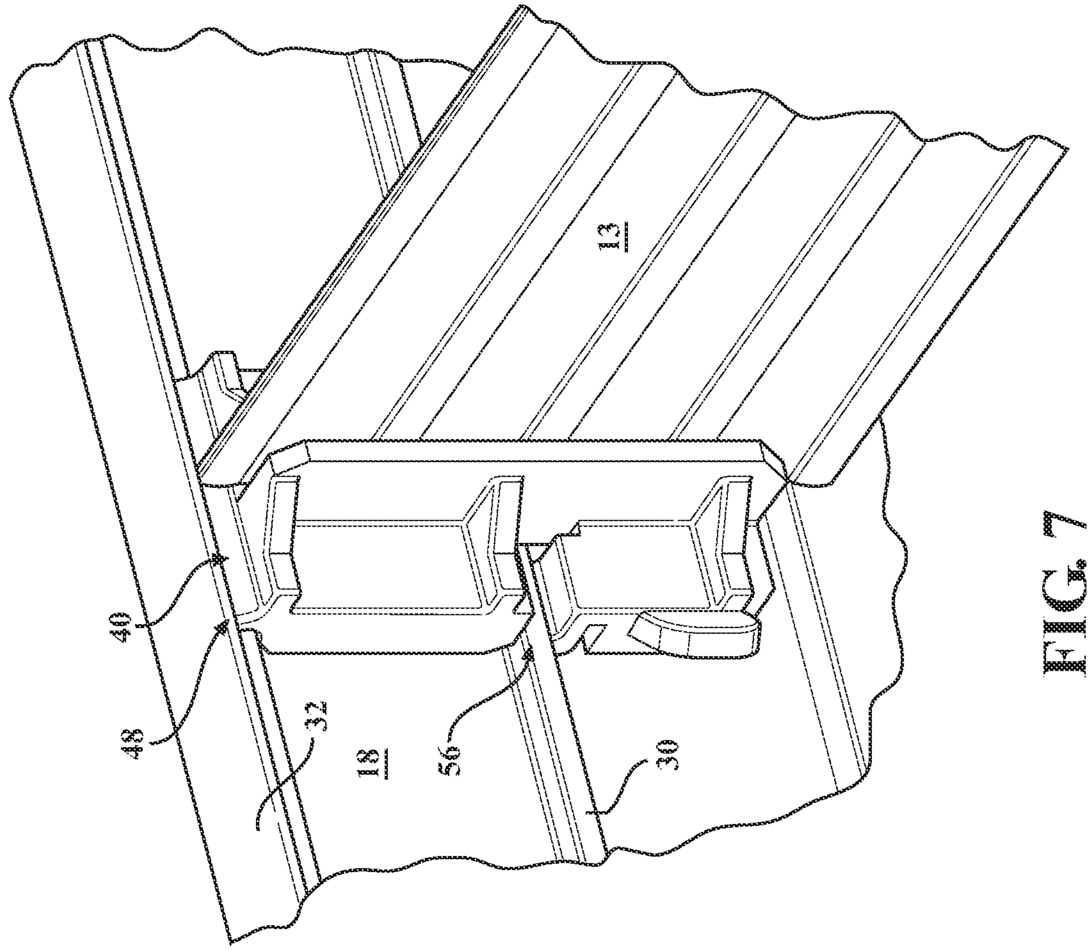
FIG. 7 is a partial perspective view of the divider and the divider clip.

With reference to the figures and in particular FIG. 6 through 8, The divider clips 40 will be described. Each divider clip 40 includes a mounting slot 42 to receive a divider 13. The slots 42 are defined by opposed walls 44. The divider 13 can be inserted into slots 42 to support the divider 13 as illustrated in FIGS. 7 and 8. Handles 39 are provided to make installation, removal, and repositioning of the divider clips easier.

The divider clips 40 have a base 46 which when clipped into the shelf mount 18 support the dividers 13. The walls 44 and handles extend outwardly from the base 46.

A first lobe 48 protrudes from the top of base 46. First lobe 48 has a bottom 50 and rounded top 52. The front face 54 has a radius so that the top 52 is slightly angled with respect to the bottom 50. This allows the first lobe 48 to be inserted into the receiver 34 and retained in the opening of receiver 34.

A second lobe 56 extends from the base 46. The second lobe 56 snaps under hook 38 on the shelf mount 18. The second lobe 56 has a leg 58 extending from base 46 and a foot 60 extending from leg 58. The foot 60 has a first angled surface 62, a plateau 64 and second angled surface 66. The angled surfaces 62 and 66 allow the second lobe 56 to cam against the hook 38 when the divider 13 is snapped into place and the first angled surface 62 to cam against the hook 38 when the divider 13 is removed. The first lobe 48 and second lobe 56 cooperate to retain the divider clip 40 on the shelf mount 22, but also allow the divider 40 to be easily removed and repositioned by merely snapping it in place. The lobe 48 is designed in such a way as to interfere with and create a significant amount of friction at points 54 and 50 when it is clipped in place on the shelf mount 18. This friction is engineered in order to prevent the clip 40 from moving when clipped in position.

With opposed divider clips 40 mounted to opposed shelf mounts 18, the divider 13 can be positioned within the facing slots 42 to mount the dividers 13 to the shelf 12.

With reference to the figures and more particularly FIGS. 1, 9, 10 and 11 the door assembly 16 will be described. The door assembly has a front panel 70 with an interior surface 72 and an exterior surface 74, opposed edges 76 and 78 and a top 80 and bottom 82. The front panel 70 is sized to fit between two spaced shelf mounts 22. As illustrated, a handle 81 is formed at the top 80 of the front panel 70 for opening and closing the door assembly 16. A latch mechanism 83 is provided to latch the door assembly 16 in the closed position and unlatched to be opened.

A hinge 84 is mounted to the bottom 82 of the panel 70. With reference to FIG. 3, the hinge 84 has a first bracket 85 which is mounted to the panel 70 by screws, welding, stamping, etc. The second bracket 86 is positioned in the space created by spacer 36 and is adapted to be connected to the shelf mount 18 by conventional means, such as screws or adhesive. A locking tab 86 is mounted to the bottom of the finger 27. This can be mounted with screws or adhesive etc.

Figure 9:
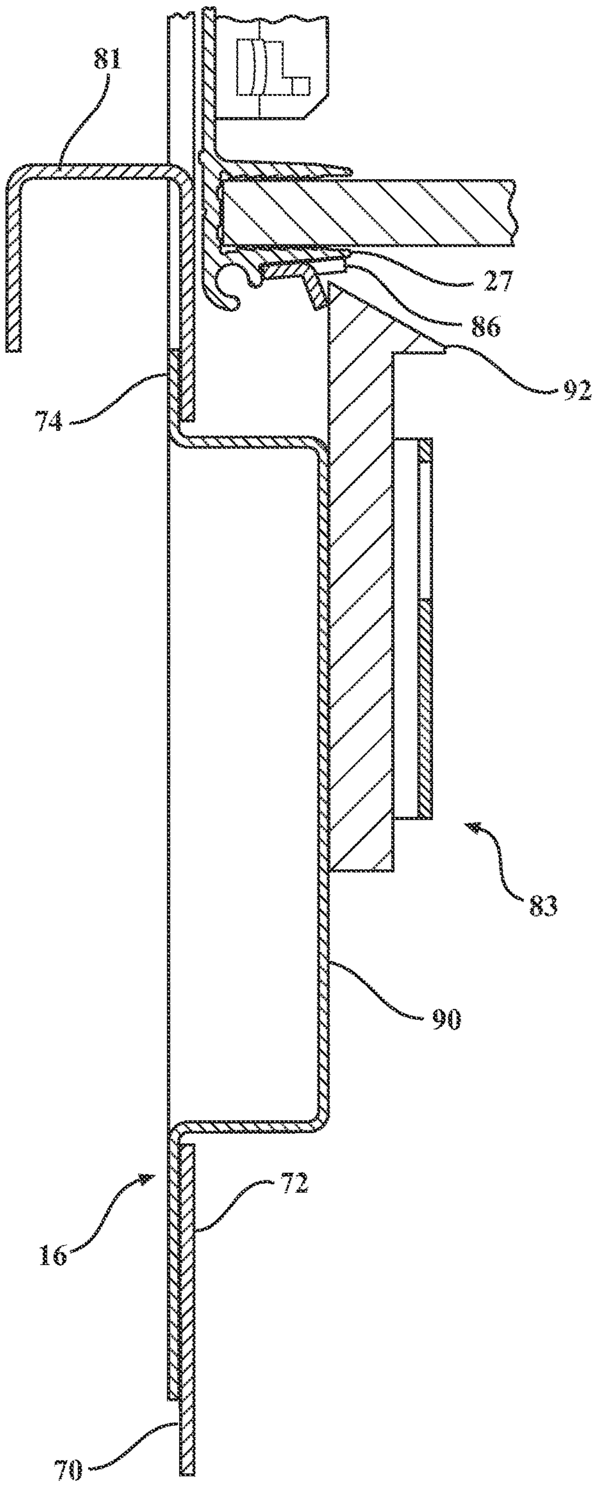
FIG. 9 is a cutaway view of the latch mechanism latched.
Figure 10:
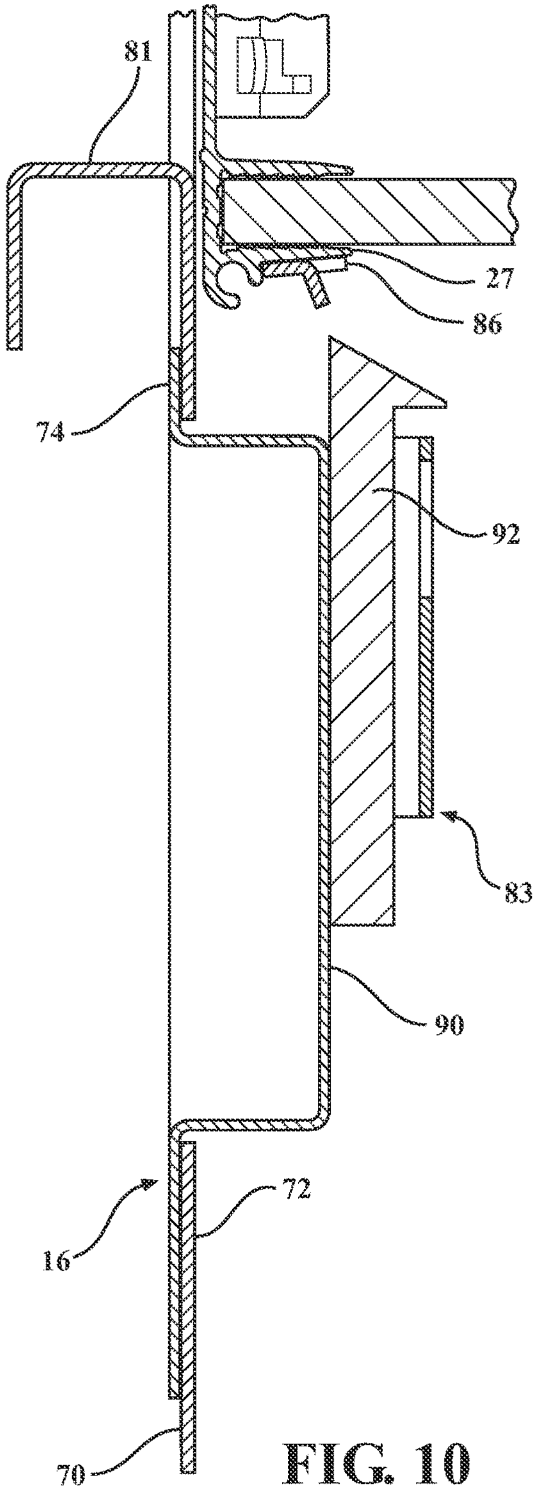
FIG. 10 is a cutaway view of the latch mechanism unlatched.
Figure 11:
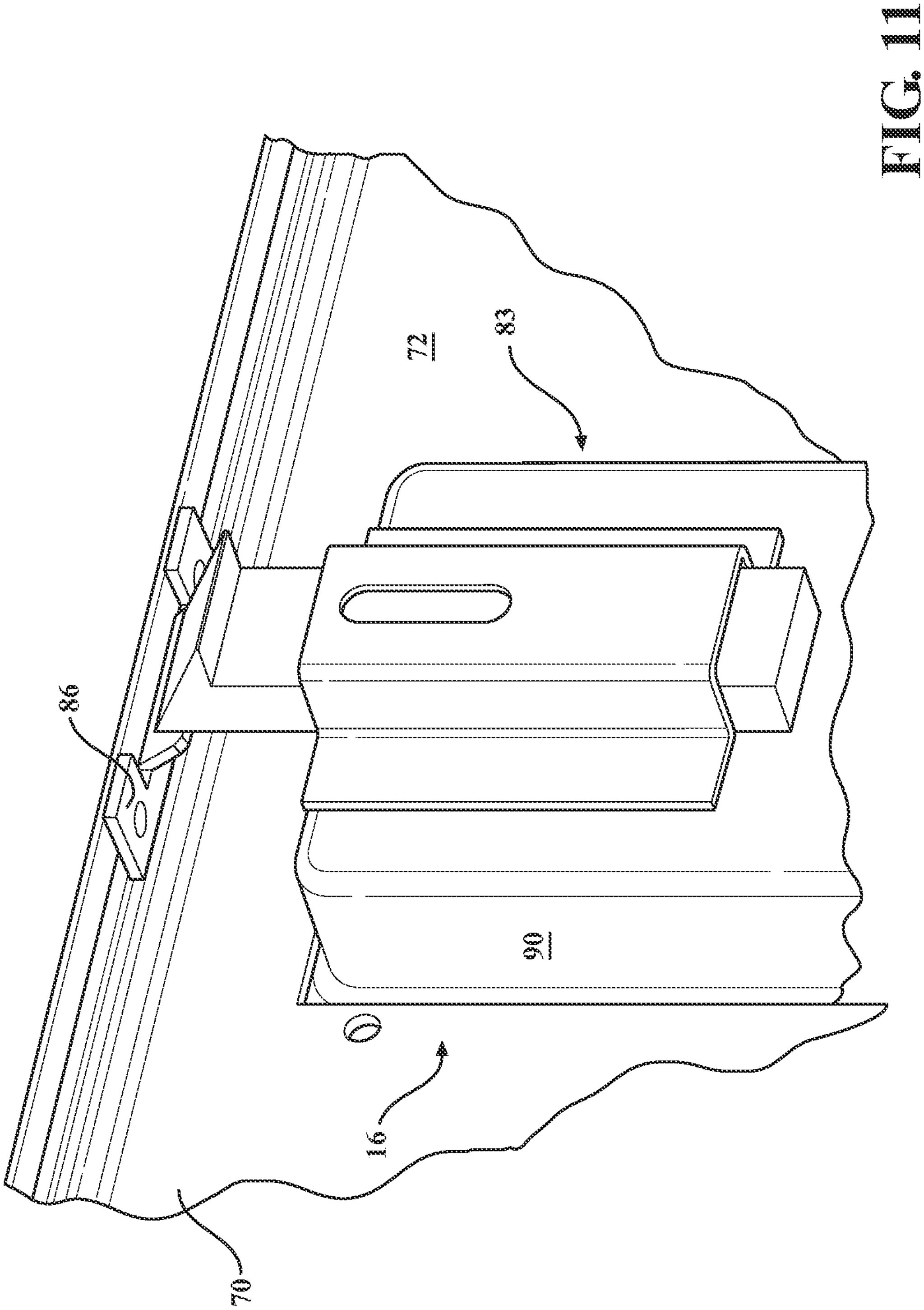
FIG. 11 is a partial perspective view of the latch mechanism.

The latch mechanism 83 has a housing 90 which protrudes inwardly into the front panel 70 to allow a user's fingers to grip within the housing 90 to raise and lower the housing with respect to the panel 70. A latch member 92 supported by the housing 90 and is raised to engage the lock tab 86 when the door is latched in the closed position and to disengage from lock tab 86 when the door 16 is to be open. When opened, the doors 16 rotates upon hinge 84 to the open position. When closed, the door 16 rotates upon hinges 18 to the closed position as shown in FIG. 9.

As will be appreciated by one of ordinary skill in the art, the shelving unit 10 of the present invention can be easily assembled with hand tools to provide an easily assembled secure, strong, and lightweight shelving unit particularly suited for mounting within a vehicle. Ss shown in FIGS. 1 and 2, mounting feet 94 are provided to mount the shelving unit 10 to the floor of a vehicle and mounting brackets can be used to mount the shelving unit 10 to the walls of a vehicle.

To assemble the shelving unit, the shelf bottom 15 is inserted into the jaws 25 of the extruded shelf mounts 18. Because the jaws are flexible, the shelf bottom can be inserted manually without tools. The shelf mounts 18 are then attached to the end panels 14. Fasteners can be inserted through the end panel into the receivers 32 and 34.

Dividers 84 can be installed by snapping the divider clips 40 to the shelf mounts 18. The divider clips 40 are snapped in by inserting the first lobe 48 into the elongated slot 35 and then snapping the second lobe 56 to the hook 38 on shelf mount 18. A divider 13 can then be positioned within the facing slots 42 to mount the divider 13 to the shelf 12.

To attach the door assembly 16, the second bracket 86 of hinge 84 is positioned in the space created by the spacer 35 and connected to the shelf mount 18 by for example screws.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A shelving unit comprising:

first and second end panels;

at least one shelf adapted to extend between said first and second end panels;

first and second shelf mounts, each having an elongated body defined by a interior side, exterior side, top, bottom, mid-section and opposed ends, said first and second shelf mounts are adapted to be mounted at said opposed ends between said first and second end panels, said first and second shelf mounts are adapted to be mounted parallel to and spaced apart from one another when mounted to said first and second end panels to create a front and a back of said at least one shelf;

a first receiver adjacent said elongated body top and a second receiver adjacent said elongated body bottom, each receiver adapted to receive a fastener to mount said first and second shelf mounts to said first and second end panels;

a first jaw extending outwardly from said mid-section of said interior side of said first shelf mount and a second jaw extending outwardly from said mid-section of said interior side of said second shelf mount, said first and second jaws facing one another and adapted to receive said at least one shelf, said first and second jaws each having opposed fingers that are adapted to flex for frictional receipt of said at least one shelf;

a first divider mounting hook protruding from said mid-section of said interior side of said first shelf mount between said first receiver and said second receiver; a second divider mounting hook protruding from said mid-section of said interior side of said second shelf mount between said first receiver and said second receiver; and a first divider clip adapted to be connected to said interior side of said first shelf mount, and a second divider clip adapted to be connected to said interior side of said second shelf mount; each of said first and second divider clips having a base and a mounting slot, said mounting slot defined by opposed walls adapted to receive said divider.

2. The shelving unit of claim 1, further including a throat between each of said first and second opposed fingers.

3. The shelving unit of claim 2, further including a groove on said exterior side of said mid-section adjacent said throat for receipt of a fastener to mount said shelf to each of said first and second shelf mounts.

4. The shelving unit of claim 1, further including at least one spacer on each of said exterior sides of that first and second shelf mounts.

5. The shelving unit of claim 1, wherein said first and second receivers are defined by an elongated hollow body.

6. The shelving unit of claim 5, wherein said first and second receivers each have an elongated slot extending the length of said elongated hollow body.

7. The shelving unit of claim 1, further including first and second lobes protruding from said base, said first lobe adapted to be received within said elongated slot and said second lobe being adapted to mate with said hook to lock said respective first and second divider clips to a respective one of said first and second shelf mounts.

8. The shelving unit of claim 7, further including a recess adjacent said second lobe, said hook adapted for insertion into said recess and mating engagement with said second lobe.

9. The shelving unit of claim 7, wherein said first receiver is at the top of said first shelf mount and said second receiver is at the bottom of said second shelf mount.

10. The shelving unit of claim 1, further including at least one handle on each of said first and second divider clips for installing said first and second divider clips.

11. The shelving unit of claim 7, wherein said first lobe has a front face, and a lower section extending to a rounded upper section.

12. The shelving unit of claim 11, wherein said front face has a radius wherein said upper section is slightly angled with respect to the lower section whereby said first lobe is adapted to be inserted into a respective one of said first and second receivers and retained in said respective elongated slot.

13. The shelving unit of claim 7, wherein the second lobe includes a leg extending from said base of each respective divider clip and a foot extending from said leg.

14. The shelving unit of claim 13, wherein said foot has a first angled surface, a plateau and second angled surface, said first and second angled surfaces are adapted to cam against said hook when said divider clip is snapped into place and the first angled surface to cam against said hook when said divider clip is removed.

15. The shelving unit of claim 1, further including a door assembly, said door assembly includes a front panel with an interior surface and an exterior surface, opposed edges and a top edge and bottom edge.

16. The shelving unit of claim 15, further including at least two sets of vertically spaced first and second shelf mounts connected to said end panels.

17. The shelving unit of claim 16, wherein said front panel is sized to fit between said two sets of vertically spaced first and second shelf mounts.

18. The shelving unit of claim 15, further including a handle adjacent said top edge of said front panel for opening and closing said door assembly.

19. The shelving unit of claim 18, further including a latch mechanism to latch said door assembly in a closed position and unlatched in an opened position.

20. The shelving unit of claim 16, further including at least one spacer on each of said exterior sides of that first and second shelf mounts;

said door assembly includes a hinge mounted adjacent said bottom edge of said panel, said hinge includes a first bracket mounted to said panel and a second bracket mounted adjacent said spacer.

21. The shelving unit of claim 15, further including a latch mechanism having a latch member adapted to be raised to engage a lock tab when said door is latched in the closed position and to disengage from said lock tab when said door is opened, said door rotates upon said hinge between the open and closed positions.

* * * * *